(12) United States Patent
Kubo et al.

(10) Patent No.: US 6,633,749 B2
(45) Date of Patent: Oct. 14, 2003

(54) FOLDING MOBILE WIRELESS DEVICE

(75) Inventors: Tetsuya Kubo, Yokohama (JP); Masao Kobayashi, Yokohama (JP); Suguru Suzuki, Yokohama (JP); Teruo Nanmoku, Kanagawa (JP); Hidehiro Yanagibashi, Kawasaki (JP); Toshihisa Ubukata, Ayase (JP)

(73) Assignees: Matsushita Electric Industrial Co. Ltd., Osaka (JP); Koritsu Chemical Co., Ltd., Kanagawa (JP)

( * ) Notice: Subject to any disclaimer, the term of this patent is extended or adjusted under 35 U.S.C. 154(b) by 0 days.

(21) Appl. No.: 09/921,473

(22) Filed: Aug. 3, 2001

(65) Prior Publication Data
US 2002/0016182 A1 Feb. 7, 2002

(30) Foreign Application Priority Data
Aug. 4, 2000 (JP) .......................................... 2000-236986

(51) Int. Cl.⁷ .............................. H04B 1/38; E05D 1/04
(52) U.S. Cl. .................... 455/90; 455/550; 379/433.13; 16/355
(58) Field of Search .......................... 455/575, 90, 347; 379/433.01, 433.05, 433.11, 433.13; 16/374, 371, 356, 319, 355; 361/814, 730

(56) References Cited

U.S. PATENT DOCUMENTS

| 4,897,873 | A | * | 1/1990 | Beutler et al. | ......... 379/433.13 |
| 5,001,659 | A | | 3/1991 | Watabe | |
| 5,628,089 | A | * | 5/1997 | Wilcox et al. | ................. 16/303 |
| 5,629,979 | A | * | 5/1997 | Domoleczny | .......... 379/433.13 |
| 5,640,690 | A | * | 6/1997 | Kudrna | ..................... 455/575.3 |
| 5,732,331 | A | * | 3/1998 | Harms | ..................... 455/575.3 |
| 5,905,796 | A | * | 5/1999 | Jung | ....................... 379/433.13 |
| 5,923,751 | A | * | 7/1999 | Ohtsuka et al. | ......... 379/433.13 |
| 5,966,776 | A | * | 10/1999 | Ona | ............................ 16/328 |
| 6,011,699 | A | * | 1/2000 | Murray et al. | .............. 361/814 |
| 6,157,717 | A | * | 12/2000 | Chintala et al. | ....... 379/433.13 |
| 6,295,358 | B1 | * | 9/2001 | Kubota | .................. 379/433.13 |
| 6,320,961 | B1 | * | 11/2001 | Hayasaka | .............. 379/433.13 |
| 6,345,097 | B1 | * | 2/2002 | Chintala et al. | ....... 379/433.13 |
| 6,470,175 | B1 | * | 10/2002 | Park et al. | .................. 455/90.1 |
| 6,523,224 | B1 | * | 2/2003 | Oshima et al. | ................ 16/335 |
| 2001/0034242 | A1 | * | 10/2001 | Takagi | ........................ 455/550 |

FOREIGN PATENT DOCUMENTS

| EP | 535 912 A2 | * | 9/1992 | |
| EP | 1 100 145 A2 | | 5/2001 | |
| EP | 1 148 693 A2 | | 10/2001 | |
| GB | 2 266 920 A | | 11/1993 | |
| GB | 2 290 344 A | | 12/1995 | |
| GB | 2 365 490 A | * | 2/2002 | ............ H04M/1/02 |
| JP | 1-212051 A | * | 8/1989 | ................. 379/434 |
| JP | 406268724 A | * | 9/1994 | |
| JP | 2001-1241254 A | | 2/2000 | |
| WO | WO 92/17974 A1 | * | 10/1992 | |
| WO | 98/19434 A1 | | 5/1998 | |

* cited by examiner

*Primary Examiner*—Charles Appiah
(74) *Attorney, Agent, or Firm*—Pearne & Gordon LLP

(57) ABSTRACT

In a folding mobile wireless device, at least one of contact portions of connecting portions which come in contact with a coupling pin has a higher strength than a portion other than the contact portion or a housing provided with the connecting portion including the contact portion.

10 Claims, 3 Drawing Sheets

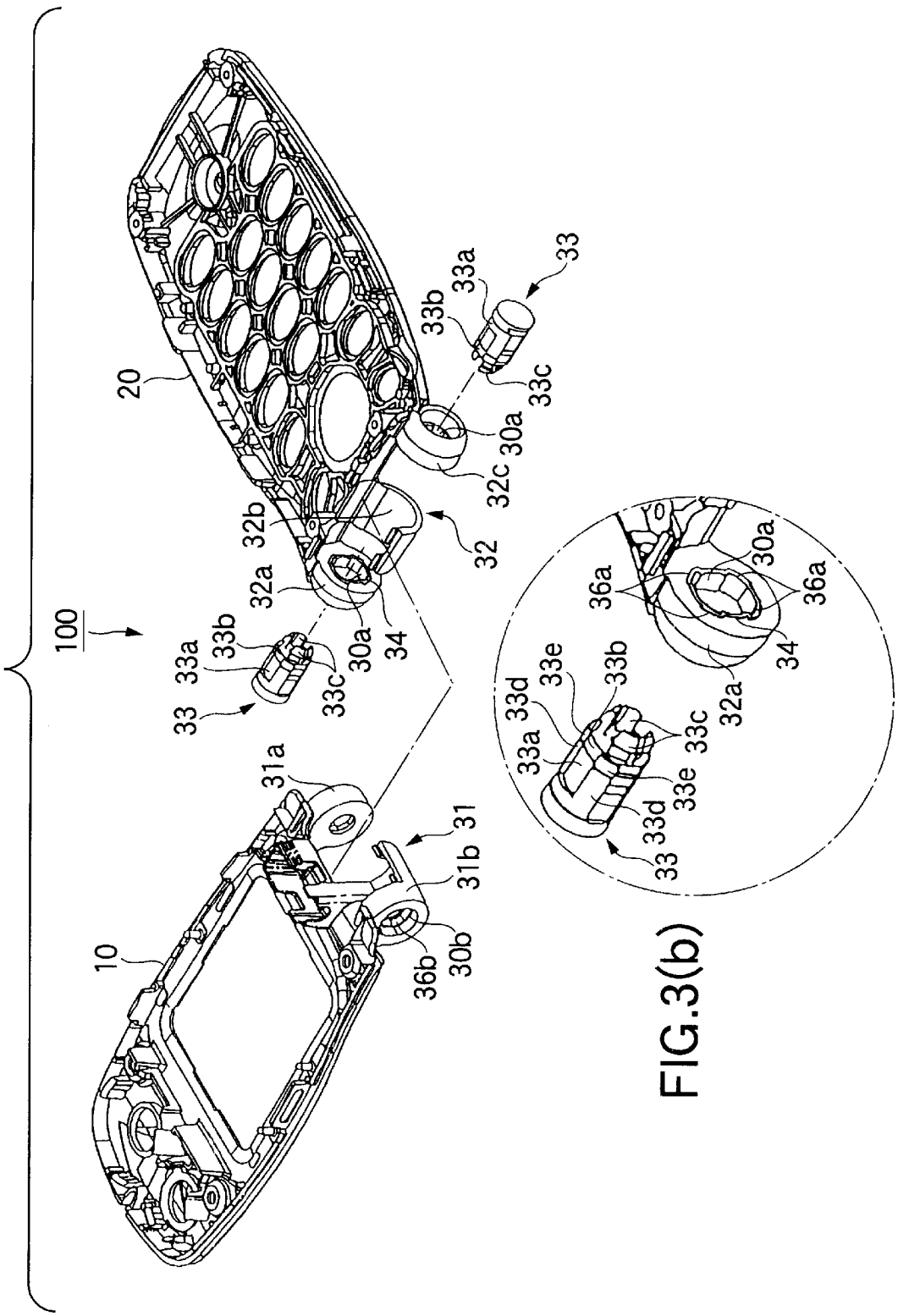

FOLDING MOBILE WIRELESS DEVICE

BACKGROUND OF THE INVENTION

1. Field of the Invention

The present invention relates to a folding mobile wireless device, and more particularly to a technology for enhancing the strength of a hinge portion of the folding mobile wireless device.

2. Description of the Related Art

In recent years, there have been developed various mobile wireless devices to enhance a reduction in a size and weight and mobility. In particular, there is a folding mobile wireless device having such a structure that a housing of the mobile wireless device is divided into an upper housing and a lower housing, and the upper and lower housings are coupled through connecting portions provided in the upper and lower housings respectively and a hinge portion constituted by a coupling pin for coupling them and can be folded. The folding mobile wireless device has such an excellent shape as to maintain operability during transmission and receipt and to be easily accommodated in a pocket or a bag.

In the conventional folding mobile wireless device, a predetermined strength has been required for the hinge portion in order to rotate and unfold or fold the upper housing and the lower housing around the hinge portion. Therefore, the upper and lower housings are formed of a metal and the connecting portion constituting the hinge portion is also formed of a metal integrally with the respective housings. However, in the case in which the upper and lower housings and the connecting portion are integrally formed of a metal, the degree of freedom of a forming work is reduced, productivity is deteriorated and the degree of freedom of the appearance of the upper and lower housings is also restricted.

In order to improve the productivity of the upper and lower housings and to enhance the degree of freedom of the appearance, it is supposed that the housing is formed of a resin and the connecting portion constituting the hinge portion is also formed of a resin integrally. However, a predetermined strength could not be maintained in the hinge portion constituted by such a connecting portion.

SUMMARY OF THE INVENTION

The invention has been made in consideration of the problems described above and has an object to provide a folding mobile wireless device capable of maintaining a predetermined strength in a hinge portion without making a housing forming work complicated.

The object of the invention can be achieved by a folding mobile wireless device which can be folded rotatably by a first housing, a second housing and a hinge portion for rotatably coupling the first housing and the second housing to each other, the hinge portion including connecting portions provided in the first housing and the second housing and a coupling pin for coupling the connecting portions, wherein at least a specific one of contact portions of the connecting portions which come in contact with the coupling pin has a higher strength than the contact portions other than the specific contact portion.

Moreover, the object of the invention can be achieved by a folding mobile wireless device which can be folded rotatably by a first housing, a second housing and a hinge portion for rotatably coupling the first housing and the second housing to each other, the hinge portion including connecting portions provided in the first housing and the second housing and a coupling pin for coupling the connecting portions, wherein at least a specific one of contact portions of the connecting portions which come in contact with the coupling pin has a higher strength than the housing provided with the connecting portion including the specific contact portion.

In this specification, the "strength" particularly implies a strength against the deformation of a component, abrasion, etc. and a hardness.

In such a folding mobile wireless device, a predetermined strength can be maintained for the hinge portion. More specifically, even if the first housing and the second housing are rotated around the hinge portion to often carry out unfolding or folding, the hinge portion is not damaged and the first housing and the second housing are coupled stably because a contact portion with the coupling pin of the connecting portions has a high strength.

Moreover, the object of the invention can be achieved by a folding mobile wireless device which can be folded rotatably by a first housing, a second housing and a hinge portion for rotatably coupling the first housing and the second housing to each other, the hinge portion including a first connecting portion provided in the first housing, a second connecting portion provided in the second housing and a coupling pin for coupling the first connecting portion and the second connecting portion, wherein the first connecting portion and the second connecting portion have different strengths from each other, and a specific contact portion coming in contact with the coupling pin in the first connecting portion or the second connecting portion which has a lower strength has a higher strength than a contact portion of the connecting portion having a higher strength.

Furthermore, the object of the invention can be achieved by a folding mobile wireless device which can be folded rotatably by a first housing, a second housing and a hinge portion for rotatably coupling the first housing and the second housing to each other, the hinge portion including a first connecting portion provided in the first housing, a second connecting portion provided in the second housing and a coupling pin for coupling the first connecting portion and the second connecting portion, wherein the first connecting portion and the second connecting portion have different strengths from each other, and a specific contact portion coming in contact with the coupling pin in the first connecting portion or the second connecting portion which has a lower strength has a higher strength than the housing provided with the connecting portion including the specific contact portion.

In such a folding mobile wireless device, even if the first housing and the second housing are formed of different materials in order to prevent a housing forming work from being complicated and to enhance the strength of the housing, a strength which is almost equal to that of the connecting portion having a high strength can be given to the connecting portion having a low strength. Therefore, a predetermined strength can be maintained for the hinge portion. In other words, since the strength of the hinge portion can be almost uniform over the whole hinge portion, the predetermined strength can be maintained for the hinge portion.

In the folding mobile wireless device, moreover, it is preferable that a reinforcing member should be provided integrally with the connecting portion of the housing to be the contact portion.

For the "reinforcing member", in the case in which the first and second housings are formed of materials having different hardnesses, for example, it is possible to use a material which is softer than a material of the harder housing and is harder than a material of the softer housing. For example, when one of the housings is formed of magnesium and the other housing is formed of a resin, aluminum and stainless can be used for the material of the reinforcing member.

In such a folding mobile wireless device, the reinforcing member can be provided integrally with the connecting portion by using insert molding and the predetermined strength can be maintained for the hinge portion.

In the folding mobile wireless device, moreover, it is preferable that the connecting portion should be formed of a resin and the reinforcing member should be formed of a metal.

In such a folding mobile wireless device, it is possible to prevent the housing forming work from being complicated and to maintain a predetermined strength for the hinge portion.

BRIEF DESCRIPTION OF THE DRAWINGS

FIGS. 3(a) and (b) are exploded perspective views showing upper and lower housings and a coupling pin in the folding mobile telephone device according to the invention, (a) being a general view and (b) being a partial enlarged view.

DETAILED DESCRIPTION OF THE PREFERRED EMBODIMENTS

An embodiment of the invention will be described below with reference to the drawings.

A folding mobile wireless device according to the embodiment will be described as a folding mobile telephone device 100 comprising a receiver (speaker) to be a receiving unit and a microphone to be a transmitting unit.

Figure 1A:
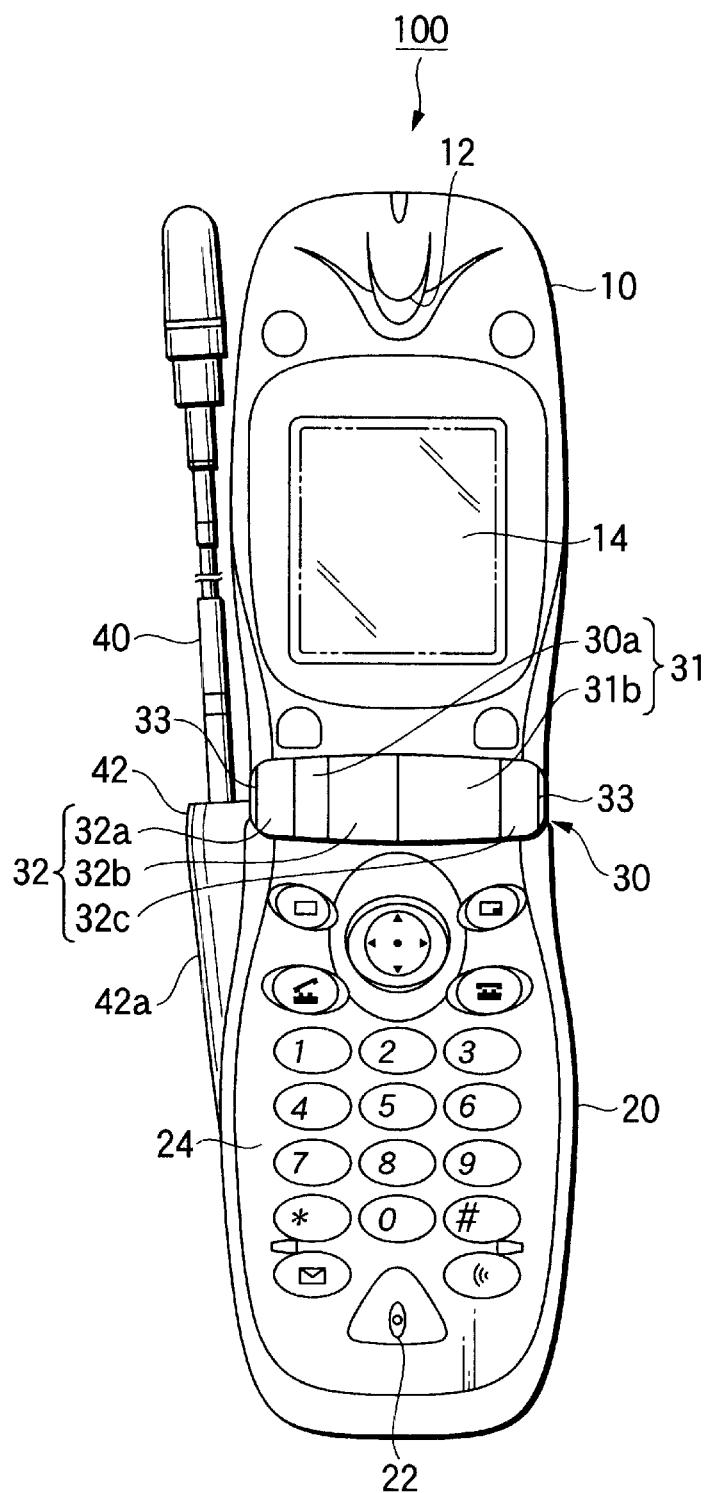
FIGS. 1(a) and 1(b) are views showing the whole appearance of a folding mobile telephone device according to the invention, (a) being a front view and (b) being a side view.
Figure 1B:
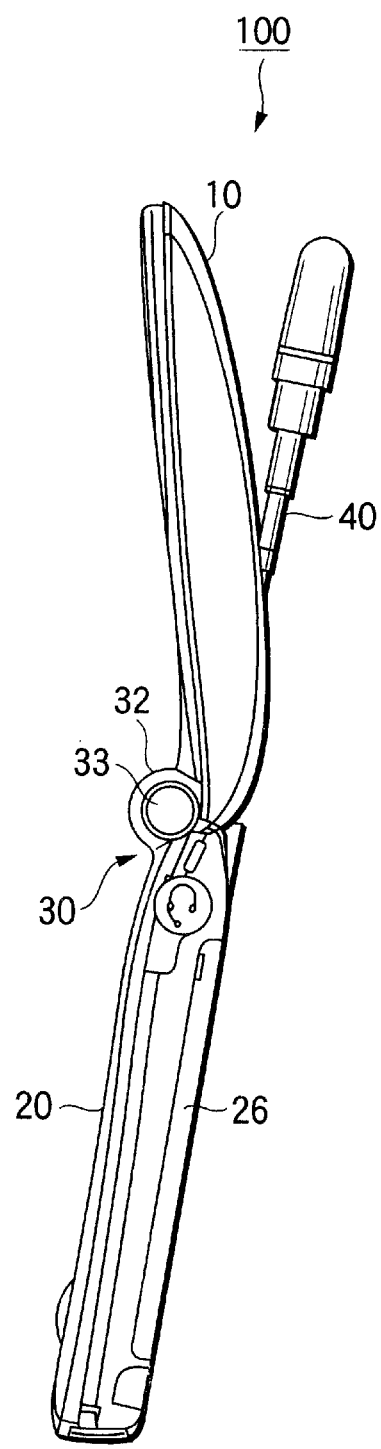

As shown in FIGS. 1(a) and 1(b), the folding mobile telephone device 100 according to the embodiment has an upper housing (first housing) 10 formed of a metal (magnesiumn) and a lower housing (second housing) 20 formed of a resin, and has such a structure that the upper housing 10 and the lower housing 20 are rotatably coupled to each other through a hinge portion 30. The hinge portion 30 has a first connecting portion 31 provided in the upper housing 10, a second connecting portion 32 provided in the lower housing 20 and coupling pins 33.

The upper housing 10 of the folding mobile telephone device 100 is rotated around the hinge portion 30 and can be thereby folded such that the upper housing 10 abuts or almost abuts on the lower housing 20. As a result, a folding state can be brought as shown in FIG. 2.

Figure 2:
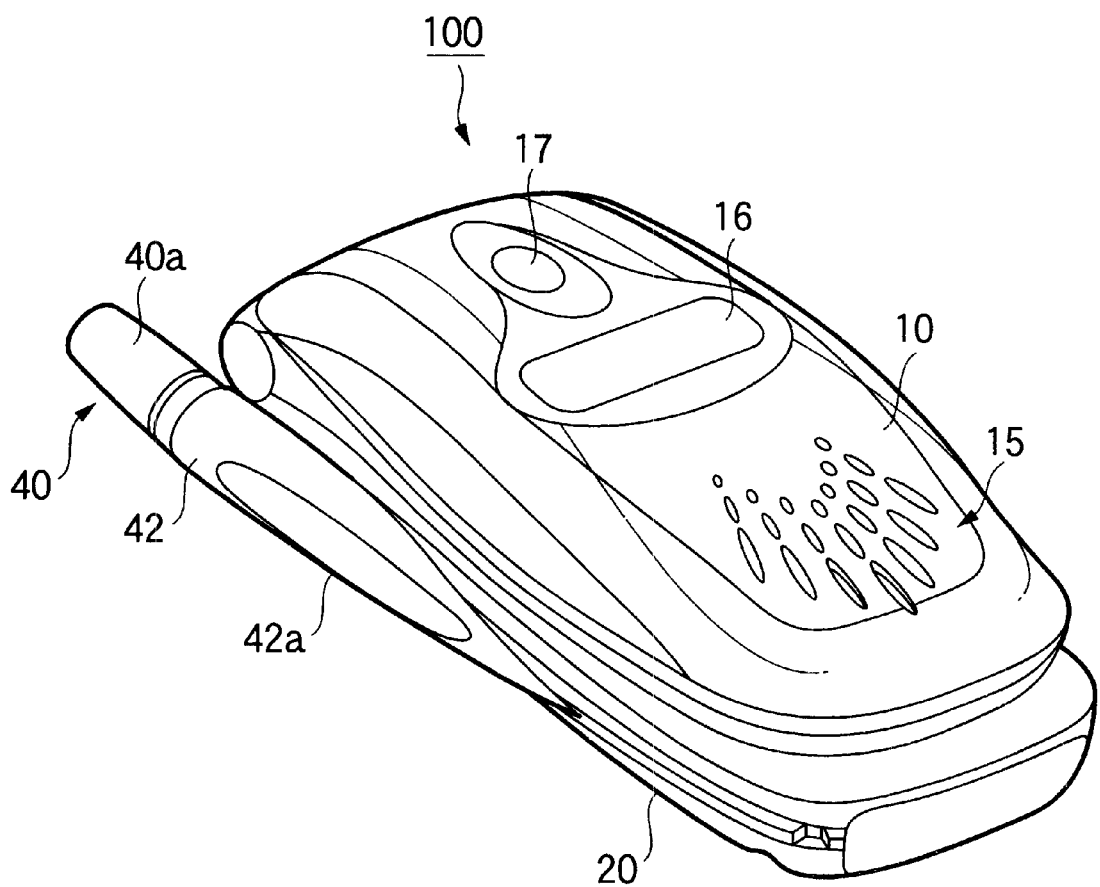
FIG. 2 is a perspective view showing the appearance of a state in which the folding mobile telephone device according to the invention is folded.

As shown in FIG. 2, the folding mobile telephone device 100 comprises a speaker 15 for making an incoming sound, a subinformation display portion 16 such as a liquid crystal display panel for displaying a telephone number of a sender during call incoming, and a back key 17 for executing the record of a voice by pressing during use which are provided on the outside surface of the upper housing 10. Moreover, an antenna housing portion 42 for accommodating an antenna 40 is provided in substantially parallel with the longitudinal direction of the lower housing 20 on one of the side surfaces of the lower housing 20 (on this side in FIG. 2 and the left side in FIG. 1(a)). The antenna 40 is extendably provided in the lower housing 20, and is pulled out toward the upper housing 10 as shown in FIGS. 1(a) and 1(b) during extension and is accommodated in the antenna housing portion 42 leaving a tip portion 40a as shown in FIG. 2 during accommodation. Moreover, the side portion of the antenna housing portion 42 is provided with a finger put concave portion 42a for preventing a finger from coming in contact with the antenna 40 when holding the folding mobile telephone device 100.

As shown in FIG. 1(a), the upper housing 10 and the lower housing 20 have dimensions in a transverse direction (dimensions in a lateral direction in FIG. 1(a)) reduced toward the hinge portion 30 side, respectively. Thus, the holding stability and design property of the housing can be enhanced. The appearance of such a housing can be obtained by the structure of the hinge portion which will be described below.

As shown in FIGS. 1(a) and (b), the upper housing 10 of the folding mobile telephone device 100 includes a receiving unit having a receiver 12 for making a sound such as a voice during a call, a main information display portion 14 such as a liquid crystal display panel, and the like. A portion of the upper housing 10 which is adjacent to the lower housing 20 is provided with a first connecting portion 31 having a plurality of cylindrical portions 31a and 31b. Moreover, the lower housing 20 includes a transmitting unit having a microphone 22 for detecting a sound such as a voice during a call, a key operating portion 24 and a battery 26. A portion of the lower housing 20 which is adjacent to the upper housing 10 is provided with a second connecting portion 32 having a plurality of cylindrical portions 32a, 32b and 32c. Reinforcing members 34 (see FIGS. 3(a) and 3(b)) are provided integrally with the cylindrical inner peripheral surfaces of the cylindrical portions 32a and 32c of the second connecting portion 32, which will be described below. The key operating portion 24 of the lower housing 20 includes a power ON/OFF switch of the folding mobile telephone device 100, a key for inputting alphanumeric characters and letters, and a function key for selectively executing various functions.

Furthermore, the lower housing 20 accommodates a main circuit board (not shown) including a wireless circuit which mounts electronic parts such as a CPU for processing various signals and a memory for storing various information. This is fixed into the lower housing 20 through a support member formed integrally with the lower housing 20.

Moreover, an auxiliary circuit board (not shown) including a driver circuit for the main information display portion 14 is accommodated in the upper housing 10 and is similarly fixed into the upper housing 10 through the support member. The main circuit board and the auxiliary circuit board are connected to each other through a flexible circuit (not shown), and various electrical signals are sent and received between the mutual circuit boards. A flexible board couples the circuit boards through the inside of the hinge portion 30.

Next, detailed description will be given to the coupling structure of the first connecting portion 31 of the upper housing 10 and the second connecting portion 32 of the lower housing 20 in the folding mobile telephone device 100 having the structure described above.

The cylindrical portions 31a and 31b of the first connecting portion 31 and the cylindrical portions 32a, 32b and 32c of the second connecting portion alternately provided, respectively. More specifically, as shown in FIG. 1(a), the cylindrical portion 32b of the second connecting portion 32 is provided substantially on the center of the hinge portion 30 and the cylindrical portions 31a and 31b of the first connecting portion 31 are provided on both sides. Furthermore, the cylindrical portions 32a and 32c of the second connecting portion 32 constituting both ends of the hinge portion 30 are provided adjacently to the cylindrical portions 31a and 31b of the first connecting portion 31, respectively.

When the coupling pins 33 are inserted from both ends into the connecting portions 31 and 32, the first connecting portion 31 and the second connecting portion 32 are coupled to each other.

FIGS. 3(a) and 3(b) are an exploded perspective views illustrating the structures of the first connecting portion 31 of the upper housing 10, the second connecting portion 32 of the lower housing 20 and the coupling pin 33 coupling them in the folding mobile telephone device 100.

As shown in FIG. 3(a), the cylindrical reinforcing members 34 formed of stainless are formed integrally with the cylindrical portions 32a and 32c through insert molding and the like over the inner peripheral surfaces of the cylindrical portions 32a and 32c constituting both ends of the hinge portion 30. The inner peripheral surface 30a of the reinforcing member 34 is provided with a concave portion 36a (see FIG. 3(b)) to be fitted on a convex portion 33d formed on the outer peripheral surface of the coupling pin 33 which will be described below. Moreover, inner peripheral surfaces 30b of the cylindrical portions 31a and 31b adjacent to the cylindrical portions 32a and 32c is also provided with a concave portion 36b to be fitted on convex portions 33e formed on the outer peripheral surface of the coupling pin 33 which will be described below.

The flexible board for connecting the main circuit board and the auxiliary circuit board is accommodated in an inside space constituted by a part of the cylindrical portion 31b and the cylindrical portion 32b which constitute a central part of the hinge portion 30 between the cylindrical portion 31a and the cylindrical portion 31b, which is not shown.

The coupling pin 33 has a cylindrical outside portion 33a, a cylindrical inside portion 33b and an engagement click 33c formed integrally with the inside portion 33b at the end of the coupling pin 33. The outside portion 33a and the inside portion 33b are rotatably connected to each other, and the inside portion 33b has such a structure that resistance force is increased by a control mechanism, which is not shown, in the outside portion 33a when a rotating angle is increased and the resistance force is eliminated when the rotation is carried out by a predetermined angle. Moreover, the convex portions 33d and 33e are formed on the outer peripheral surfaces of the outside portion 33a and the inside portion 33b. Furthermore, the coupling pin 33 is formed of a resin having a proper hardness.

When the coupling pin 33 is inserted into the hinge portion 30, the outside portion 33a of the coupling pin 33 is accommodated in the cylindrical portions 32a or 32c of the second connecting portion 32, and the inside portion 33b of the coupling pin 33 is accommodated in the cylindrical portions 31a or 31b of the first connecting portion 31. At this time, the convex portions 33d and 33e formed on the outer peripheral surface of the coupling pin 33 are fitted in the concave portions 36a and 36b formed on the inner peripheral surfaces 30a and 30b, respectively. Thus, the outside portion 33a and the inside portion 33b in the coupling pin 33 are prevented from being relatively moved with respect to the inner peripheral surfaces 30a and 30b, respectively. Furthermore, when the coupling pins 33 are inserted up to a predetermined position in the hinge portion 30, each engagement click 33c is engaged with the end walls of the cylindrical portions 31a or 31b in the first connecting portion 31, and the first connecting portion 31 and the second connecting portion 32 are coupled to each other through the coupling pins 33.

In the folding mobile telephone device 100 having the structure described above, when the upper housing 10 and the lower housing 20 are rotated around the hinge portion 30 and are thus unfolded or folded, the outside portion 33a and the inside portion 33b in the coupling pin 33 provided in the hinge portion 30 are rotated relatively. Furthermore, the unfolding and folding states of the folding mobile telephone device 100 are controlled by the resistance force generated when the outside portion 33a and the inside portion 33b in the coupling pin 33 are rotated. For example, when the upper and lower housings 10 and 20 are to be unfolded from the folding state of the folding mobile telephone device 100, the outside portion 33a and the inside portion 33b are rotated against an increase in the resistance force generated in the coupling pin 33 so that the upper and lower housings are unfolded.

By providing the metallic reinforcing members 34 on the inner peripheral surfaces of the cylindrical portions 32a and 32c constituted by the resin as in the embodiment, a strength against deformation or abrasion can be enhanced over the inner peripheral surfaces of the cylindrical portions 32a and 32c in the second connecting portion 32 formed of a resin. Moreover, when the upper housing 10 and the lower housing 20 are rotated around the hinge portion 30 and are thereby unfolded or folded, the outside portion 33a of the coupling pin 33 is moved relatively in the cylindrical portions 32a and 32c of the second connecting portion 32 so that the end walls of the concave portion 36a in the cylindrical portions 32a and 32c can be prevented from being abraded and worn.

Accordingly, even if the upper housing 10 and the lower housing 20 are often rotated around the hinge portion 30 and are thus unfolded and folded, the upper and lower housings 10 and 20 can be coupled stably.

The invention is not restricted to the embodiment but can be properly changed and modified.

While the reinforcing member 34 is provided in the cylindrical portions 32a and 32c of the second connecting portion 32 in the embodiment, it may be provided in the cylindrical portions 31a and 31b of the first connecting portion 31 if the strengths of the cylindrical portions 31a and 31b in the first connecting portion 31 are to be enhanced.

Moreover, while the upper and lower housings 10 and 20 are constituted by different materials in the embodiment, they may be constituted by the same material. In that case, the reinforcing member 34 may be provided on both the first connecting portion 31 and the second connecting portion 32.

As described above, according to the folding mobile wireless device of the invention, a predetermined strength can be maintained for the hinge portion.

FIG.1(a)
FIG.1(b)
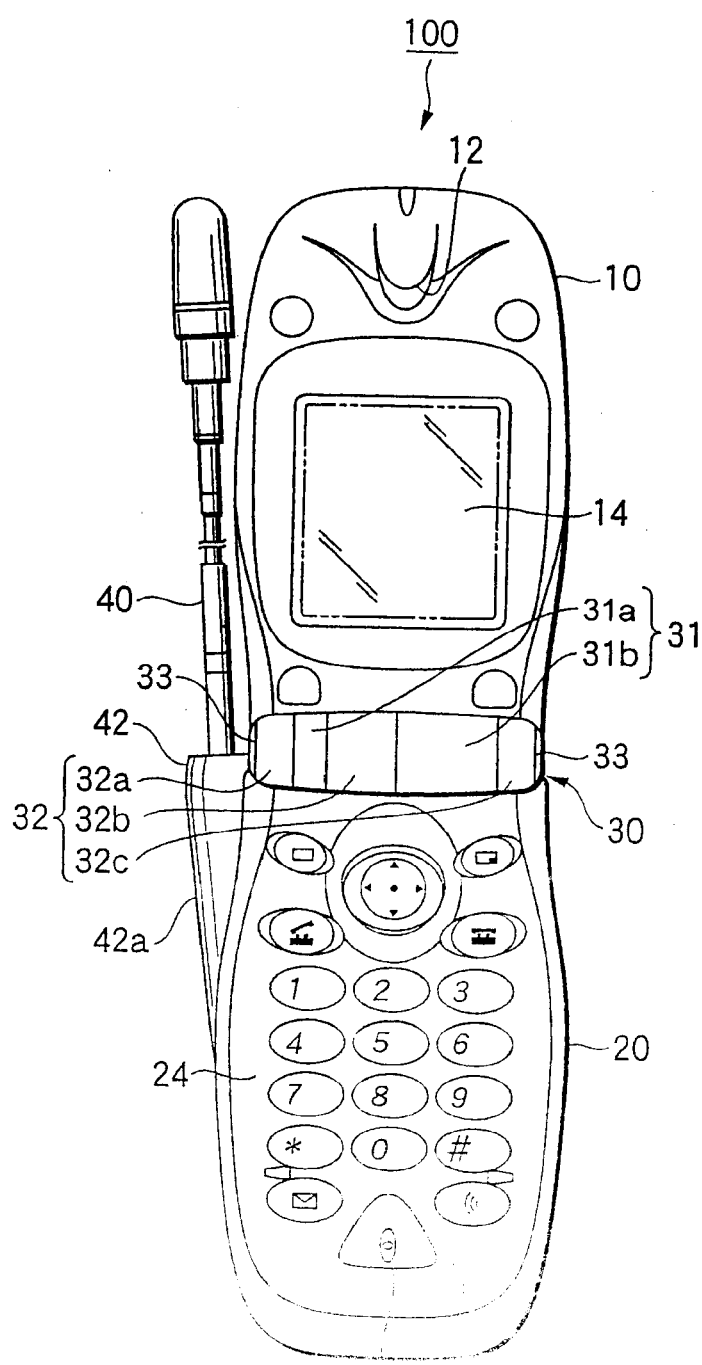
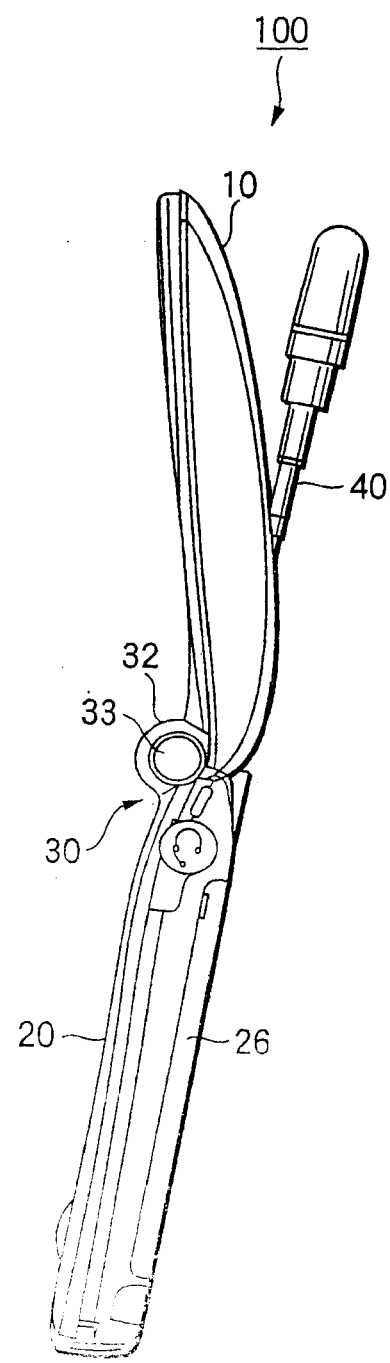

What is claimed is:

1. A folding mobile wireless device comprising:

a first housing;

a second housing; and a hinge portion for rotatably coupling said first housing and said second housing to each other, said hinge portion including connecting portions respectively provided in said first housing and said second housing and a coupling pin for coupling said connecting portions, wherein at least one first contact portion of said connecting portions which come in contact with said coupling pin has a higher strength than a second contact portion other than said first contact portion, wherein said first contact portion is a reinforcing member, which is provided integrally with said connecting portion of at least one of said first housing and said second housing.

2. The folding mobile wireless device according to claim 1, wherein said connecting portion of at least one of said first housing and said second housing is formed of a resin and said reinforcing member is formed of a metal.

3. A folding mobile wireless device comprising:

a first housing;

a second housing; and a hinge portion for rotatably coupling said first housing and said second housing to each other, said hinge portion including connecting portions respectively provided in said first housing and said second housing and a coupling pin for coupling said connecting portions, wherein at least one contact portion of said connecting portions which come in contact with said coupling pin has a higher strength than one of said first housing and said second housing, provided with said contact portion, wherein said contact portion is a reinforcing member, which is provided integrally with said connecting portion of at least one of said first housing and said second housing.

4. The folding mobile wireless device according to claim 3, wherein said connecting portion of at least one of said first housing and said second housing is formed of a resin and said reinforcing member is formed of a metal.

5. A folding mobile wireless device comprising;

a first housing including a first connecting portion;

a second housing including a second connecting portion;

a hinge portion rotatably coupling said first housing and said second housing to each other, said hinge portion including at least one coupling pin for coupling said first connecting portion and said second connecting portion, wherein said first connecting portion and said second connection portion have different strengths from each other, wherein said first connecting portion has a lower strength and said second connecting portion has a higher strength, and wherein at least one first contact portion coming in contact with said coupling pin in said first connecting portion has a higher strength than a second contact portion coming in contact with said coupling pin in said second connecting portion.

6. The folding mobile wireless device according to claim 5, wherein said first contact portion is a reinforcing member, which is provided integrally with said connecting portion having a lower strength.

7. The folding mobile wireless device according to claim 6, wherein said connecting portion having a lower strength in said housing is formed of a resin and said reinforcing member is formed of a metal.

8. A folding mobile wireless device comprising;

a first housing including a first connecting portion;

a second housing including a second connecting portion; and a hinge portion rotatably coupling said first housing and said second housing to each other, said hinge portion including a coupling pin for coupling said first connecting portion and said second connecting portion, wherein said first connecting portion and said second connection portion have different strengths from each other, and wherein at least one first contact portion, coming in contact with said coupling pin in one of said first connecting portion and said second connecting portion which has a lower strength, has a higher strength than said housing provided with said connecting portion including said first contact portion.

9. The folding mobile wireless device according to claim 8, wherein said first contact portion is a reinforcing member, which is provided integrally with said connecting portion having a lower strength.

10. The folding mobile wireless device according to claim 9, wherein said connecting portion having a lower strength in said housing is formed of a resin and said reinforcing member is formed of a metal.

* * * * *

UNITED STATES PATENT AND TRADEMARK OFFICE
CERTIFICATE OF CORRECTION

| | | |
|---|---|---|
| PATENT NO. | : 6,633,749 B2 | |
| APPLICATION NO. | : 09/921473 | |
| DATED | : October 14, 2003 | |
| INVENTOR(S) | : Tetsuya Kubo et al. | |

It is certified that error appears in the above-identified patent and that said Letters Patent is hereby corrected as shown below:

Replace Sheet 1 of 3, containing Figures 1(a) and 1(b) with the attached sheet 1/3, containing Figures 1(a) and 1(b).

Signed and Sealed this

Twentieth Day of June, 2006

JON W. DUDAS
*Director of the United States Patent and Trademark Office*